UNITED STATES PATENT OFFICE.

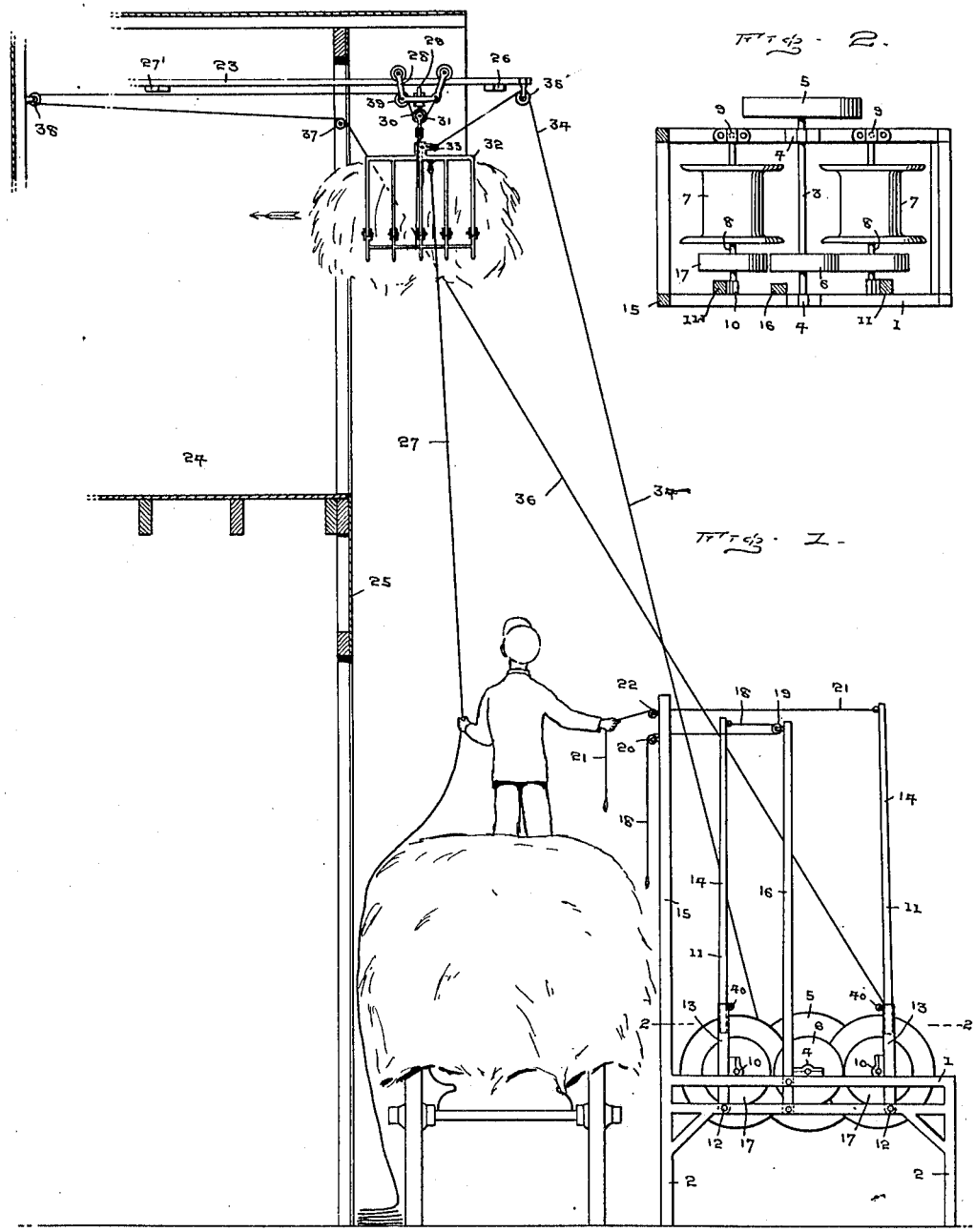

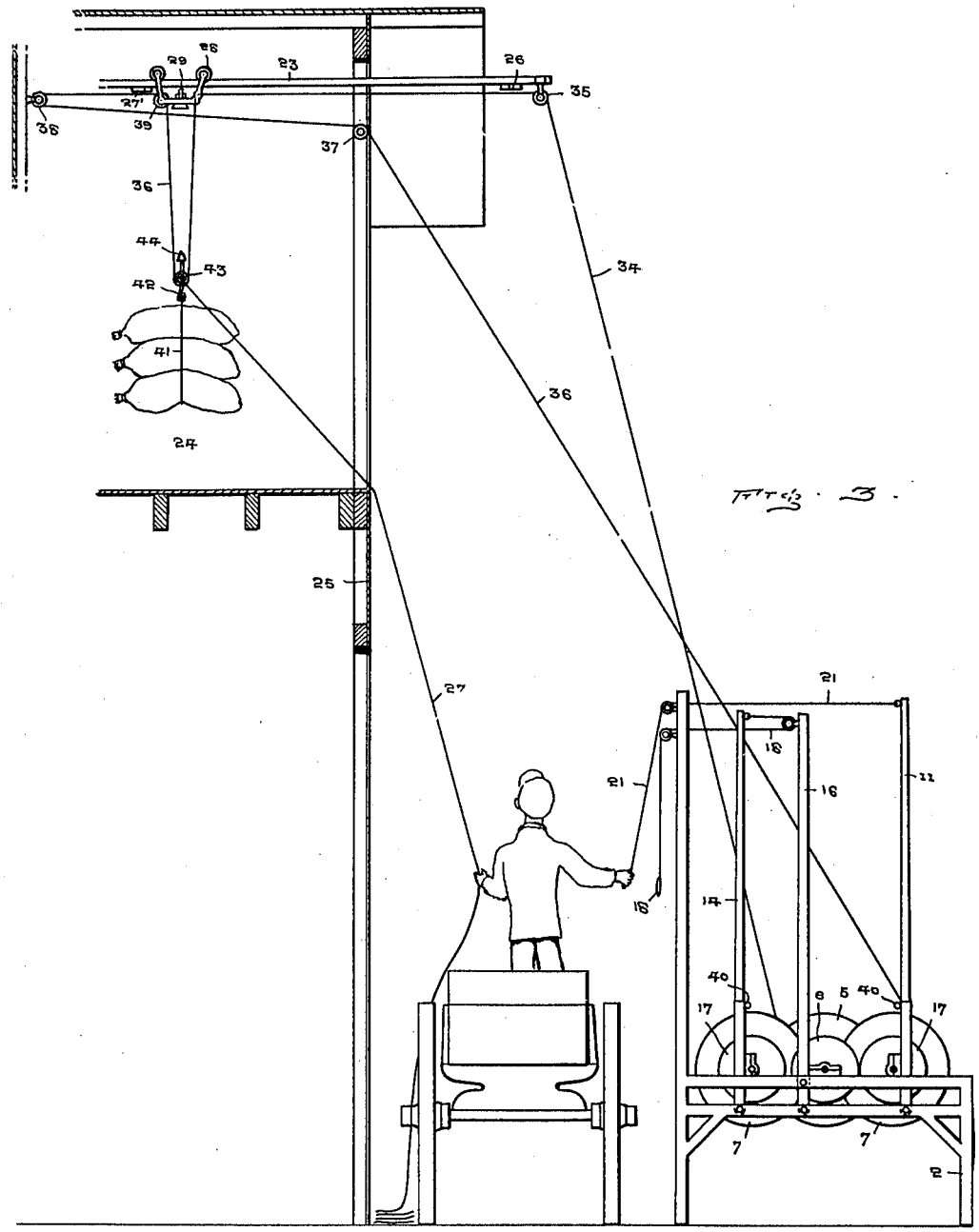

STEPHEN C. HARPER, OF HAMPTON, MISSISSIPPI.

HOISTING AND CONVEYING APPARATUS.

1,311,692.  Specification of Letters Patent.  Patented July 29, 1919.

Application filed August 16, 1917. Serial No. 186,458.

*To all whom it may concern:*

Be it known that I, STEPHEN C. HARPER, a citizen of the United States, residing at Hampton, in the county of Washington and State of Mississippi, have invented certain new and useful Improvements in Hoisting and Conveying Apparatus; and I do hereby declare the following to be a full, clear, and exact description of the invention, such as will enable others skilled in the art to which it appertains to make and use the same.

This invention relates to new and useful improvements in unloading, loading and conveying apparatus, and has for its principal object to provide apparatus of this character wherein the movements of the hay carrier and the hay fork supported by it can be controlled and released as desired without the liability of injury to these parts.

A further object of the invention is to provide and interpose suitable friction gearing between the power shaft and the winding drums with suitable means for selectively throwing the friction gearing into gear with the winding drums, whereby the draft cables connected to the drums can be controlled at will.

With these and other objects in view which will appear as the description proceeds, the invention comprises the various novel features of construction, combination and arrangement of parts as will be more fully described hereinafter and set forth with particularity in the appended claim.

Referring to the drawings,

Figure 1 represents a diagrammatic view of the unloading and conveying apparatus, showing the hay carrier in the act of being conveyed into the hay mow, and Fig. 2 represents a sectional plan view taken on the line 2—2 of Fig. 1.

Fig. 3 represents a diagrammatic view showing a slightly different arrangement of the unloading and conveying apparatus.

Similar characters of reference are used to denote corresponding parts throughout the accompanying drawings and the following description.

Referring more particularly to the drawings, the reference numeral 1 represents a suitable framework which in this instance is rectangular and is supported by suitable braced legs 2. A power shaft 3 is disposed transversely of the supporting frame and is journaled in rigidly mounted bearings 4. One end of the power shaft projects beyond one side of the supporting frame and is provided with a drive wheel 5, while the opposite end of the shaft is provided with a friction wheel 6.

A suitable winding drum 7 is arranged on each side of the power shaft 3 and is rigidly mounted on a drum shaft 8. One end of each drum shaft 8 is journaled in a pivotally mounted bearing 9, while the opposite end is journaled in a bearing 10 rigidly mounted on a vertically disposed lever 11 which has its lower end pivotally mounted and supported by the frame 1, as indicated by the numeral 12. Each of the levers 11, in this instance, consists of a lower section 13 which is provided with a suitable socket for the reception of the lower ends of the upper section 14. By this means any desired height of lever can be readily attained so as to make the pull thereon substantially horizontal with the operator, notwithstanding the difference in height of the load. Also by having the levers pivoted at their lower ends, at a point beyond their connection with the bearings 10 of the shafts 8, I attain greater leverage and render the operation more efficient.

Extending vertically from one corner of the supporting frame 1 is a standard 15, and extending vertically from the supporting frame at a point intermediate the levers 11 is another standard 16.

Each of the drum shafts 8 is provided with a friction wheel 17 which is rigidly connected therewith and is adapted to engage the friction wheel 6. In order to selectively engage the friction wheel 17 with the wheel 16, I have provided suitable cable actuating means. The upper end of one of the levers 11 has connected to it one end of a pull cable 18 which is trained around a pulley 19 carried by the upper end of the standard 16 and is then trained over a pulley 20 carried by the standard 15 so as to be within easy reach of the person who is unloading the hay and operating the apparatus. The other lever 11 is adapted to be operated through the medium of a pull cable 21 which has one end connected to the lever and the other end trained over a pulley 22 carried by the standard 15 so as to be within easy reach of the operator. By actuating either of the pull cables 18 or 21, either of the friction wheels 17 may be selectively thrown into frictional engagement with the friction wheel 6.

The reference numeral 23 represents a track suitably mounted in the upper portion of a hay mow 24 of a barn or stable 25. This track 23 is provided at its outer end with a trip member 26 and may, if desired, be provided at any suitable point within the hay mow with another trip member 27' for a purpose which will be presently explained. A hay carrier 28 is slidably mounted upon the track and is provided with the usual spring-pressed grab jaws 29 which are adapted to automatically grab and hold the shank 30 of the sheave 31 which in turn supports the hay fork or grapple 32. The hay fork is provided with a release catch 33 to which is connected one end of a cable 34, this cable in turn being guided over a pulley 35 supported by the outer end of the track 23 and is then conducted downwardly and wound around one of the winding drums 7.

A suitably guided cable 36 has one end wound around the other winding drum 8 and is continued upwardly and in this instance guided over pulleys 37 and 38, the termial end of the cable passing over a pulley 39 carried by the hay carrier and beneath the sheave 31 and rigidly attached to the frame of the carrier. This cable 36 is utilized for conveying the hay carrier inwardly of the mow while the cable 34 is used for tripping the hay fork and subsequently conveying it out of the mow.

In the operation of the device, and we will say for the purpose of illustration that the operator has engaged a bundle of hay with the hay fork and caused the latter with the hay to ascend into engagement with the hay carrier by pulling upon the cable 21, then by a continued pull upon the cable 21, the hay carrier and the fork supported by it will be moved inwardly into the hay mow and just prior to the limit of the inward movement of the hay carrier, the cable 21 is released so as to arrest the movement of the carrier. The pull cable 18 is then grasped and given a pull sufficient to cause the friction gearing to wind up the cable 34. The initial winding movement of the cable 34 will trip the hay fork and release the hay from it and the continued pull upon the cable will cause the carrier to move outwardly of the mow until the spring-pressed grab jaws 29 engage the trip 26, whereupon the hay fork will be released from the carrier and allowed to descend upon the release of the pull cable 18. The fork may be then again engaged with a sufficient amount of hay and the cable 21 again actuated to elevate and convey the same into the mow.

A guy rope 27 has one end attached to the hay fork and may be conveniently used by the operator to steady the load while being hoisted or lowered.

When it is desired to use the apparatus for taking hay out of the mow, the end of the cable 34 is disconnected from the trip 33 and attached to the carrier 28, whereby the trip may be then operated by hand or a rope attached thereto.

Assuming the hay carrier to be within the mow, the hay fork is lowered and engaged with a bundle of hay, the cable 21 pulled which will elevate the fork with its load until the shank 30 of the sheave locks within the grab jaws of the carrier 28, whereupon the cable 21 is released and the cable 18 pulled which will cause the carrier to move outwardly into engagement with the trip 26. As soon as the fork is released from the carrier, the cable 18 is released also and the cable 21 again pulled to cause the friction gearing to act as a brake and thus check the descent of the hay fork with its load as desired. The guy rope 27 may be also used to steady the descent of the load and direct its landing.

After the load has been deposited, the cable 21 may be again pulled to cause the fork to ascend into engagement with the carrier and together with the latter travel inwardly of the mow until the trip 27' is engaged, whereupon the fork will descend at a rate of speed governed by using the friction gearing as a brake.

In Fig. 3 the apparatus is shown rigged up for loading and unloading articles such as bags of grain from a mow or loft, to or from a wagon. In this instance the bags of grain are tied into a bundle by a rope 41 which is engaged over a hook 42 carried by the sheave 43, said sheave also carrying a headed shank 44 for locking engagement with the jaws 29 of the carrier 28.

The operation of the apparatus in this instance is substantially the same as previously described. In order to raise the load to the carrier, the cable 21 is pulled, after which the cable 18 is pulled to convey the carrier and its load out of the mow into engagement with the trip 26, whereupon the cable 18 is released and the cable 21 again pulled as desired to check the descent of the load, the guy rope 27 being used to steady and place the load.

While I have described the method of unloading articles from a mow, it will be apparent from the foregoing that the apparatus can also be conveniently used for loading articles thereinto.

If desirable, the upper sections 14 of the levers may be removed and the pull cables 18 and 21 suitably guided and attached to eyes 40 carried by the lower sections 13, whereby the latter may be operated from the ground in preference to an elevated position.

I claim:—

In an unloading and conveying apparatus, a supporting frame, a power shaft mounted therein and provided with a friction wheel, a drum shaft upon each side of said power shaft having one end mounted in a pivoted bearing, a drum upon each of said drum shafts, vertically disposed levers pivotally mounted in the frame below said drum shafts in which the other ends of said shafts are rotatably mounted, a friction wheel carried by each drum shaft for engagement with the friction wheel on the power shaft, a fixed operating standard at one side of the frame, a centrally disposed fixed standard, an operating cable extending from the free end of one lever and over a pulley upon said central standard to said operating standard, and an independent operating cable extending from the free end of the other lever to said operating standard.

In testimony whereof I have signed my name to this specification in the presence of two subscribing witnesses.

STEPHEN C. HARPER.

Witnesses:
T. H. Shock,
Mrs. T. H. Shock.